United States Patent [19]
Barnes

[11] Patent Number: 6,077,332
[45] Date of Patent: Jun. 20, 2000

[54] MAGNETIC TRAP FOR REMOVAL OF IRON FROM AMINES

[75] Inventor: David Richard Barnes, Houston, Tex.

[73] Assignee: Air Products and Chemicals, Inc., Allentown, Pa.

[21] Appl. No.: 09/097,217

[22] Filed: Jun. 12, 1998

[51] Int. Cl.[7] .................................................. B01D 35/06
[52] U.S. Cl. ................................. 95/28; 95/195; 95/205; 96/1; 96/2; 96/234; 210/222; 210/695
[58] Field of Search .............................. 95/28, 235, 236, 95/195, 205; 96/1, 2, 234; 210/695, 222

[56] References Cited

U.S. PATENT DOCUMENTS

| | | | |
|---|---|---|---|
| 2,622,937 | 12/1952 | Taylor | 96/2 |
| 4,671,807 | 6/1987 | Charlton | 96/2 |
| 4,731,186 | 3/1988 | Belasco | 95/28 |
| 4,941,973 | 7/1990 | Suzuki et al. | 210/222 |
| 4,946,589 | 8/1990 | Hayes | 210/222 |
| 5,714,063 | 2/1998 | Brunsting | 210/222 |
| 5,735,937 | 4/1998 | Dingfelder | 96/1 |

FOREIGN PATENT DOCUMENTS 2142792  2/1995  Canada .

OTHER PUBLICATIONS

A. E. Keller, et al., "Heat–stable Salt Removal from Amines by the HSSX Process Using Iron Exchange" pres. @ Laurence Reid Gas Conditioning Conf. Mar. 2, 1992, pp. 61–92.

C. Richard Pauley, "Face the Facts About Amine Foaming", Chemical Engineering Progress, Jul., 1991, pp. 31–38.

Primary Examiner—Duane S. Smith

[57] ABSTRACT

A process for reducing iron containing contaminants from a process stream of amine used for acid gas stripping by passing the process stream of amine adjacent a magnet sufficient to extract at least a portion of the iron containing contaminants from the process stream of amine, and an apparatus for removing iron containing contaminants from a process stream of amine used to strip acid gases from said amine in a cyclic flowpath having a main source of a process stream of amine, a conduit for containing the flow of a slipstream of the main source of the process stream of amine, a magnet adjacent the conduit sufficient to extract at least a portion of the iron containing contaminants from the process stream of amine, a filter for removing particulates from the slipstream upstream of the magnet, a filter for removing particulates from the slipstream downstream of the magnet, and a conduit for returning the slipstream to the main source of a process stream of amine with a reduced iron containing contaminant content.

15 Claims, 1 Drawing Sheet

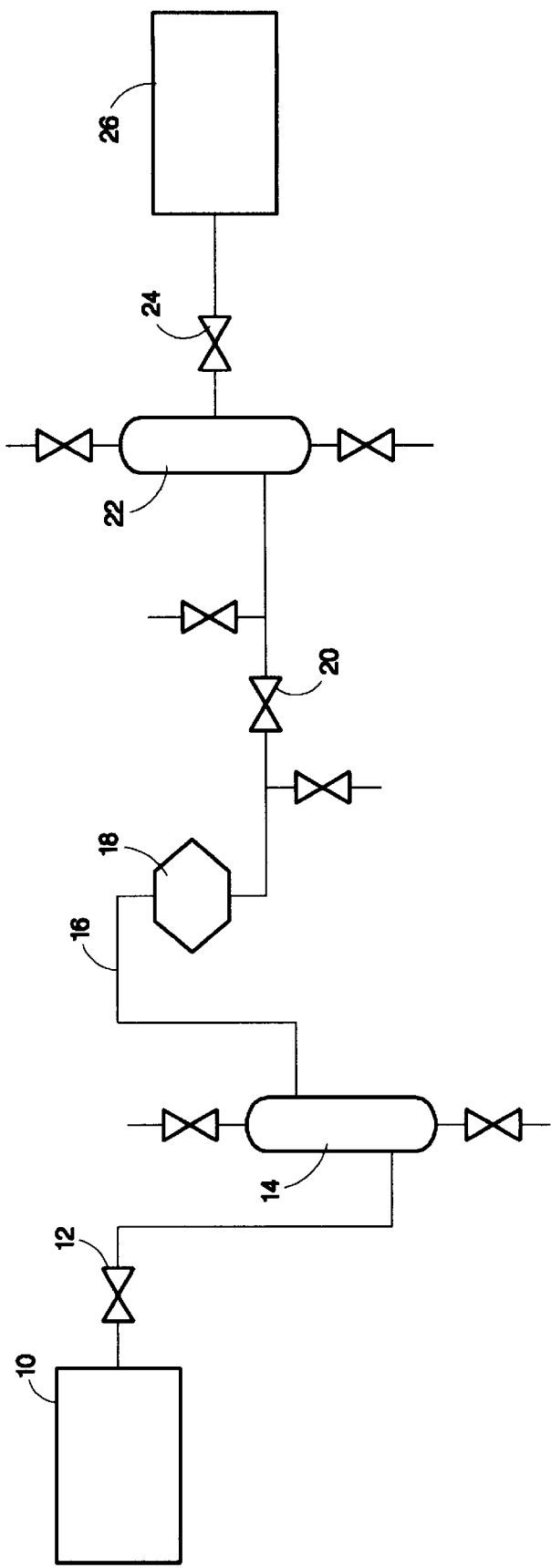

MAGNETIC TRAP FOR REMOVAL OF IRON FROM AMINES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The gas processing industry including syngas, refinery gas, and natural gas processors have long removed acid gases, such as carbon dioxide and hydrogen sulfide, from their feed gas streams to remove contaminants, to upgrade BTU value, and to meet environmental restrictions.

Typically, acid gases have been removed from synthesis gas, refinery gas, and natural gas by countercurrent passage of the feed gas in a multi-contact tray column in which the feed gas passes in one direction while an amine scrubbing solution passes in countercurrent fashion to the feed gas. In this manner, the acid gases of carbon dioxide and hydrogen sulfide contained in the feed gas are absorbed in the basic amine solution and essentially stripped from the feed gas to result in a sweetened or carbon dioxide and hydrogen sulfide lean feed gas, as a product of the overall process. The amine stripping solution now rich in acid gas, comprising: carbon dioxide and hydrogen sulfide, is then removed for regeneration, typically, by reduction in pressure or elevation in temperature or a combination of reduction in pressure and elevation in temperature to desorb the acid gases of carbon dioxide and hydrogen sulfide from the amine stripping solution, effectively regenerating the amine solution for recycle for more duty in treating the feed gas from a sour feed gas to a sweetened product feed gas by the removal of the acid gases into the amine absorbent stripping solution.

Typical amine solutions include monoethanolamine (MEA), diethanolamine (DEA), and methyldiethanolamine (MDEA). These amine stripping solutions may contain various additives for stabilization, foam control, anticorrosion properties, and absorption enhancement.

During the course of processing of sour feed gas streams with the amine stripping solution, various contaminants are introduced into this solution via the sour feed gas stream or can be generated in situ within the overall acid gas stripping system due to the corrosion of internal surfaces of the equipment and degradation of the amine stripping solution. Among these contaminants may be various carboxylic acids, as well as corrosion products of the materials of construction of the system. The corrosion products may be various iron or iron sulfide by-products of the iron bearing materials of construction.

Various attempts have been made by the prior art to remove these contaminants, to enhance performance of the acid gas stripping process, reduce corrosion of materials of construction, extend the life time of the amine stripping solution as well as the materials of construction, and to increase acid gas stripping efficiency by reducing the tendency of the contaminants to initiate foaming of the amine stripping solution, which is detrimental to the appropriate countercurrent contact of the amine stripping solution with the sour feed gas and the subsequent regeneration of the amine stripping solution.

Canadian Patent 2,142,792 recognized the utility of various iron bearing compounds for the catalysis of hydrocarbons in the presence of oxygen or air to produce carboxylic acids.

A. E. Keller, et al., "Heat-stable Salt Removal from Amines by the HSSX Process Using Iron Exchange," presented at the Laurence Reid Gas Conditioning Conference, Mar. 2, 1992, pages 61–92, describes the existence of amine heat-stable salts which make the amine solution more corrosive. This corrosion leads to increased amounts of iron sulfide particles in the amine solution. This article suggests the use of ion exchange based technology to remove heat stable salt anions and metal cations from amine solutions.

C. Richard Pauley, "Face the Facts About Amine Foaming," Chemical Engineering Progress, July, 1991, pages 31–38, describes the problems arising in amine stripping solutions due to the presence of fine particulates, such as iron sulfide. These iron sulfides are recognized as stabilizing foams, which foams are detrimental to the efficient operation of an amine stripping solution. The article goes on to identify that ionic iron catalyzes the oxidation of MEA and DEA amine solutions. The ionic iron increases amine degradation leading to increases in organic acid content which promotes foaming. Rust or iron oxide is also identified as a fine particulate, which can stabilize the detrimental foam occurring in amine stripping solutions. The article suggests removal of ionic and compound forms of iron using mechanical filtration.

The prior art has recognized the presence of iron and iron compounds in amine stripping solutions and the detrimental corrosion and foaming properties that the iron and iron compounds create in the amine stripping solutions during their operation. The prior art has suggested ion exchange beds and mechanical filtration to remove such iron species. However, these resolutions of the problem represent costly mechanical features having relatively complex construction and difficult regeneration. The industry requires a simple, easily regenerated and inexpensive means to remove detrimental iron and iron compounds from acid gas stripping amine solutions in the sour gas treatment field. The present invention overcomes the drawbacks of the prior art with a simple, inexpensive, easily regenerated method and means of removing ionic iron and iron compounds from amine stripping solutions to maintain low levels of corrosion, low levels of foaming, and efficient performance of the amine stripping solutions to convert sour feed gases to sweetened feed gases, by the removal of acid gases, as will be set forth in greater detail below.

BRIEF SUMMARY OF THE INVENTION

The present invention is a process for reducing iron containing contaminants from a process stream of amine used for acid gas stripping comprising passing the process stream of amine adjacent a magnet sufficient to extract at least a portion of the iron containing contaminants from the process stream of amine.

Preferably, the acid gas is selected from the group consisting of carbon dioxide, hydrogen sulfide and mixtures thereof.

Preferably, the amine is selected from the group consisting of monoethanolamine, diethanolamine, methyldiethanolamine and mixtures thereof.

Preferably, the process stream of amine strips acid gases from a feed gas selected from the group consisting of synthesis gas, natural gas, refinery gas and mixtures thereof.

Preferably, the iron containing contaminant is selected from the group consisting of ionic iron, iron sulfide, iron salts of carboxylic acids and mixtures thereof.

Preferably, the magnet is selected from the group consisting of permanent magnets, electromagnets and combinations of such magnets.

Preferably, the process stream of amine passes through a conduit having the magnet outside the conduit.

Preferably, the process stream of amine passes directly against the surface of the magnet.

The present invention is also an apparatus for removing iron containing contaminants from a process stream of amine used to strip acid gases from the amine, comprising;

a) a conduit for containing the flow of the process stream of amine;

b) a magnet adjacent the conduit sufficient to extract at least a portion of the iron containing contaminants from the process stream of amine.

Preferably, the magnet is a permanent magnet.

Alternatively, the magnet is an electromagnet.

Preferably, the magnet is outside the conduit.

Alternatively, the magnet is inside the conduit.

Further alternatively, the magnet is integral to the conduit.

Preferably, the conduit is part of a system, further comprising;

c) a main source of a process stream of amine, used to strip acid gases from a feed gas stream in a cyclic flowpath, from which said conduit of part a) is a slipstream;

d) a filter for removing particulates from said slipstream upstream of said magnet;

e) a filter for removing particulates from said slipstream downstream of said magnet; and f) a conduit for returning said slipstream to said main source of a process stream of amine with a reduced iron containing contaminant content.

BRIEF DESCRIPTION OF SEVERAL VIEWS OF THE DRAWINGS

FIG. 1 is a schematic illustration of a preferred embodiment of the present invention in a cyclic amine acid gas stripping process.

DETAILED DESCRIPTION OF THE INVENTION

The present invention is a process for reducing iron containing contaminants from a process stream of amines, such as monoethanolamine, diethanolamine, and methyldiethanolamine, used for acid gas stripping from sour feed gases to result in sweetened feed gas, wherein the process stream of amines passes either through or adjacent a magnet of sufficient strength to attract and retain iron, ionic iron, and iron containing contaminants from the process stream of amine, to remove these iron bearing materials from the amine stripping solution and thereby reduce corrosion, foaming and degradation of the amines.

The iron containing contaminant is typically present in the amine stripping solution in the form of ionic iron, iron sulfide or iron salts of carboxylic acids. The iron is typically leached from materials of construction of the process equipment, wherein the iron is reacting with the acidic hydrogen sulfide or carboxylic acid degradation products of the amine stripping solution and potentially contaminants introduced through the sour feed gas from the refinery feed gas or synthesis gas or natural gas being processed for sweetening.

The magnets should be sized appropriately for the volume of amine stripping solution passing the magnets for a given period of time, taking into account the size of the conduit, the flow rate of the amine and the determined content of iron species in the amine solution. Although it is possible to use electromagnets to provide the magnetic field necessary to extract the iron bearing contaminates, it is simplest to merely use permanent magnets, either affixed to an appropriate portion of the conduit or located in the flowpath within the conduit for contact with the iron containing contaminant bearing amine solutions. Alternatively, it is contemplated that a special receptacle may be installed in the conduit wherein space is allowed for the accumulation of iron materials adjacent the magnet and magnetic field, so as not to decrease the cross-sectional flow path of the amine stripping solution and also to allow for ready cleanout of the accumulated iron containing contaminants either with or without shutdown of the particular amine stripping solution flow path. This can be contemplated in which a receptacle box containing a magnet is hooked into the conduit and represents a trap or dropout receptacle in the amine stripping solution conduit, or it could be envisioned that an appropriate bypass with appropriate valving for the amine stripping solution could be fabricated in the vicinity of the magnets location so as to allow the conduit where the magnet is in place to be taken out of service without curtailing the continuous flow of amine stripping solution to the stripping column where sour feed gas is processed.

It is appreciated that sour gas processing is well recognized technology in the field of gas processing and does not require further elaboration in this discussion of the magnetic removal of iron containing contaminants. Appropriate depictions of the overall sour gas stripping and amine solution regeneration are available such as in the Pauley article sited in the Background of the Prior Art section of this Patent.

A preferred embodiment of the present invention will now be described with regard to a schematic illustration of only a section of the sour gas treatment process, wherein a slipstream or bypass stream of the amine stripping solution rather than the main amine stripping solution itself is treated for removal of iron containing contaminants. This treatment is sufficient to minimize the amount of iron containing contaminants in the overall quantity of amine stripping solution being continuously recycled through the sour gas stripping vessel.

With regard to the drawing accompanying the present Patent, a source of the amine stripping solution containing iron containing contaminants, such as a slipstream of the amine stripping solution which is less than a predominant amount of the amine stripping solution, is depicted as 10 in the accompanying drawing. This slipstream passes through control valve 12 which allows the iron treating slipstream process to be bypassed during shutdown and also controls the volume of slipstream being processed. After the amine stripping solution passes through valve 12, it then passes through a cartridge filter 14 which comprises a mechanical filter to remove fine particulates and is generally constructed of a wound extruded polymer of dimensionally stable filaments. The initially filtered amine stripping solution containing iron containing contaminants then passes through line 16 and passes adjacent or through the magnetic trap 18. As depicted in the drawing, the magnetic trap represents a vessel wherein iron containing contaminants are accumulated due to the extraction of the magnets by the attraction of the iron containing contaminants to the magnetic field of the magnets. Preferably, the amine stripping solution directly contacts the surfaces of the magnets. Alternatively, given sufficient strength in the magnetic field, it can be contemplated that the magnets would be outside the actual conduit 16 where the amine stripping solution is passing. It is also envisioned that the magnets could either be permanent magnets, as the case in the preferred embodiment, or they could be electromagnets, as are well recognized in the field. Although not illustrated, means can be provided to allow for the removal of the magnets for replacement with new magnets or for the removal of the sludge or build up of iron containing contaminants from the magnetic trap by adequate manholes or cleanout devices or sumps, providing for the accumulation and the removal of the iron containing contaminants. After removal of a part or all of the iron containing contaminants, the amine stripping solution passes through an additional control valve 20 which again can be used to take out of service the downstream cartridge filter 22 similar to cartridge filter 14. After passage through cartridge filter 22 to further remove any remaining particulates, particularly overflow from the magnetic trap, the amine stripping solution passes through control valve 24 which again can be used in conjunction with control valve 12 to completely isolate the magnetic trap slipstream circuit for maintenance and regeneration. After passage through control valve 24, the amine stripping solution now reduced in concentration of iron containing contaminants leaves the system through appropriate outlet 26, which returns the treated amine stripping solution to the circuit from which it was removed at 10.

The preferred operating condition for the amine slipstream is to be at relatively low pressure at 150 psig or below and ambient temperature, because this reduces the cost of the magnetic trap and allows for the most cost effective installation. The normal operating environment of the slipstream is 50 psig at ambient temperature with a flow rate of up to 50 gallons per minute. Higher flow rates are possible, but the cost is prohibitive.

Based upon experiments using the above described system, iron was reduced from 33 ppm to less than 10 ppm. Analytical results show that the rate of formation of heat stable salts, which are catalyzed by iron containing contaminants, was cut by more than 50% from approximately 5 lbs. per day of formate previous to the installation of the magnetic trap to less than 2.5 lbs. per day afterwards.

As set forth above, the present invention overcomes the problems in the prior art of removing iron containing contaminants from an amine stripping solution used to process sour feed gas streams for removal of acid gases, such as carbon dioxide and hydrogen sulfide. The prior art has used various complex systems, including filters and ion exchange medium, to attempt to provide a solution to this outstanding problem. However, the present invention using the simplicity of permanent magnets or electromagnets in a slipstream or in the mainstream of an amine stripping solution circuit achieves the desired goal of significant reduction and potential elimination of: iron containing contaminants; the resulting corrosion and foaming tendencies that they impart, as well as amine degradation, by the use of a simple magnetic system adjacent or in the flow path of the amine stripping solution or a slipstream thereof. This provides an unexpected enhancement in acid gas treatment providing increased efficiency, low cost and low maintenance.

The present invention has been set forth with regard to several preferred embodiments, but the full scope of the present invention should be ascertained from the claims which follow.

What is claimed is:

1. A process for reducing iron containing contaminants from a process stream of amine used for acid gas stripping comprising passing said process stream of amine adjacent a magnet sufficient to extract at least a portion of said iron containing contaminants from said process stream of amine.

2. The process of claim 1 wherein said acid gas is selected from the group consisting of carbon dioxide, hydrogen sulfide and mixtures thereof.

3. The process of claim 1 wherein said amine is selected from the group consisting of monoethanolamine, diethanolamine, methyldiethanolamine and mixtures thereof.

4. The process of claim 1 wherein said process stream of amine strips acid gases from a feed gas selected from the group consisting of synthesis gas, natural gas, refinery gas and mixtures thereof.

5. The process of claim 1 wherein said iron containing contaminant is selected from the group consisting of ionic iron, iron sulfide, iron salts of carboxylic acids and mixtures thereof.

6. The process of claim 1 wherein said magnet is selected from the group consisting of permanent magnets, electromagnets and combinations of the such magnets.

7. The process of claim 1 wherein said process stream of amine passes through a conduit having said magnet outside said conduit.

8. The process of claim 1 wherein said process stream of amine passes directly against the surface of said magnet.

9. An apparatus for removing iron containing contaminants from a process stream of amine used to strip acid gases from said amine, comprising;

a) a conduit for containing the flow of said process stream of amine;

b) a magnet adjacent said conduit sufficient to extract at least a portion of said iron containing contaminants from said process stream of amine;

c) a main source of a process stream of amine, used to strip acid gases from a feed gas stream in a cyclic flowpath, from which said conduit of part a) is a slipstream;

d) a filter for removing particulates from said slipstream upstream of said magnet;

e) a filter for removing particulates from said slipstream downstream of said magnet; and f) a conduit for returning said slipstream to said main source of a process stream of amine with a reduced iron containing contaminant content.

10. The apparatus of claim 9 wherein said magnet is a permanent magnet.

11. The apparatus of claim 9 wherein said magnet is an electromagnet.

12. The apparatus of claim 9 wherein said magnet is outside said conduit.

13. The apparatus of claim 9 wherein said magnet is inside said conduit.

14. The apparatus of claim 9 wherein said magnet is integral to said conduit.

15. The process of claim 1 wherein said process stream is a slipstream of a main source of a process steam of amine, said slipstream is passed through a first filter upstream of passing said slipstream adjacent said magnet and said slipstream is passed through a second filter downstream of passing said slipstream adjacent said magnet.

* * * * *